United States Patent
Goulette et al.

(10) Patent No.: US 7,861,517 B2
(45) Date of Patent: Jan. 4, 2011

(54) METHOD AND SYSTEM FOR CONTROLLING CATALYST TEMPERATURE

(75) Inventors: David Goulette, Marine City, MI (US); Joseph V. Bonadies, Clarkston, MI (US)

(73) Assignee: Delphi Technologies, Inc., Troy, MI (US)

(*) Notice: Subject to any disclaimer, the term of this patent is extended or adjusted under 35 U.S.C. 154(b) by 606 days.

(21) Appl. No.: 11/271,716

(22) Filed: Nov. 9, 2005

(65) Prior Publication Data

US 2007/0101698 A1 May 10, 2007

(51) Int. Cl.
*F01N 3/00* (2006.01)

(52) U.S. Cl. ............... 60/286; 60/279; 60/284; 60/295; 60/303

(58) Field of Classification Search .......... 60/274, 60/279, 284, 285, 286, 295, 300, 303
See application file for complete search history.

(56) References Cited

U.S. PATENT DOCUMENTS

| | | | | |
|---|---|---|---|---|
| 5,465,574 A | * | 11/1995 | Ma | 60/300 |
| 5,685,144 A | * | 11/1997 | Ma | 60/274 |
| 5,711,149 A | * | 1/1998 | Araki | 60/278 |
| 5,964,089 A | * | 10/1999 | Murphy et al. | 60/286 |
| 6,023,929 A | * | 2/2000 | Ma | 60/295 |
| 6,708,486 B2 | * | 3/2004 | Hirota et al. | 60/297 |
| 6,745,560 B2 | * | 6/2004 | Stroia et al. | 60/286 |
| 6,843,054 B2 | * | 1/2005 | Taylor et al. | 60/275 |
| 2003/0163988 A1 | | 9/2003 | Kirwan et al. | |

FOREIGN PATENT DOCUMENTS

| | | |
|---|---|---|
| CA | 2503602 | 4/2004 |
| DE | 10211122 | 9/2003 |
| EP | 1421987 | 5/2004 |

OTHER PUBLICATIONS

EP Search Report dated Mar. 5, 2009.

* cited by examiner

*Primary Examiner*—Tu M Nguyen
(74) *Attorney, Agent, or Firm*—Thomas N. Twomey

(57) ABSTRACT

A method for controlling temperature of a catalyst. The method includes monitoring temperature of the catalyst and determining that the catalyst is outside of a catalyst operating temperature window. If the catalyst temperature is high enough for exothermic reaction to occur, reformate is injected into the catalyst. If the catalyst not high enough for exothermic reaction to occur, reformate is injected upstream of the catalyst and ignited.

8 Claims, 2 Drawing Sheets

METHOD AND SYSTEM FOR CONTROLLING CATALYST TEMPERATURE

TECHNICAL FIELD

The present disclosure relates generally to exhaust systems, and in particular to a method and system for controlling catalyst temperature in an exhaust system.

BACKGROUND

Upcoming emission regulations for diesel engines are driving manufacturers to incorporate after-treatment devices in the exhaust systems in order to comply with these regulations. These devices could include: Diesel Particulate Filters, Oxidation Catalysts, NOx Adsorbers, SCR Catalysts, etc. Due to the nature of operation, diesel engines have a relatively low exhaust gas temperature. This low exhaust gas temperature presents a challenge to the after-treatment devices that tend to operate more efficiently within a temperature window. During a cold start emission test, the engine exhaust gas remains below the temperature operating range of the after-treatment devices for a long period of time resulting in exhaust gas that was not treated being emitted out the tailpipe. These emissions can contribute significantly to the measured regulated emission data. In some instances during normal operation (such as idle conditions or low speed/load points) the temperature of the exhaust gas can drop below the operating window of the after-treatment device. In order to fully realize the potential of the after-treatment device, the temperature would need to be maintained inside the temperature window. Thus, a way of increasing the temperature of the device is needed.

Several different approaches have been investigated including: post injection of fuel in cylinder to create an exotherm, burner systems, and electrically heated catalysts. Post injection of fuel in the cylinder has had some success in raising exhaust gas temperature in combination of using an oxidation catalyst to create an exotherm but has limitations on cold start due to a higher catalyst light off temperature. This method does have limitations in that the fuel consumption can be large due to combustion of the fuel in the cylinder where little hydrocarbons reach the oxidation catalyst to create the required exotherm. Another drawback of this type of system is the potential for cylinder wall wetting creating oil dilution in the engine leading to more frequent oil changes and potential engine failure. Burner type systems have been effective in heating but require complex ignition and control systems as well as additional hardware added to system. Electrically heated catalyst systems require large amounts of electrical energy resulting in large fuel economy penalties. Also, as the engine size goes up, so does the exhaust flow rate resulting in even higher amounts of energy consumed to increase the temperature of the exhaust gas.

SUMMARY

Embodiments of the invention include a method for controlling temperature of a catalyst. The method includes monitoring temperature of the catalyst and determining that the catalyst is outside of a catalyst operating temperature window. If the catalyst temperature is high enough for exothermic reaction to occur, reformate is injected into the catalyst. If the catalyst not high enough for exothermic reaction to occur, reformate is injected upstream of the catalyst and ignited.

Embodiments of the invention include a system for controlling temperature of a catalyst. The system includes an exhaust after-treatment device containing the catalyst; a temperature sensor monitoring temperature of the catalyst and generating a temperature signal; a controller receiving the temperature signal; a reformer in fluid communication with the after-treatment device and in communication with the controller; an igniter upstream of the after-treatment device. The controller determines that the catalyst is outside of a catalyst operating temperature window. If the catalyst temperature is high enough for an exothermic reaction to occur, the controller commands the reformer to inject reformate to the catalyst. If the catalyst is not high enough for exothermic reaction to occur, the controller commands the reformer to inject reformate upstream of the catalyst and commands the igniter to ignite the reformate.

The above described and other features are exemplified by the following figures and detailed description.

BRIEF DESCRIPTION OF THE DRAWINGS

Referring now to the figures, which are exemplary embodiments, and wherein like elements are numbered alike.

DESCRIPTION

At the outset of the description, it should be noted that the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. Unless defined otherwise, technical and scientific terms used herein have the same meaning as is commonly understood by one of skill in the art to which this invention belongs. The modifier "about" used in connection with a quantity is inclusive of the stated value and has the meaning dictated by the context (e.g., includes the degree of error associated with measurement of the particular quantity).

In describing the arrangement of exhaust treatment devices within a system, the terms "upstream" and "downstream" are used. These terms have their ordinary meaning. For example, an "upstream" device as used herein refers to a device producing a fluid output stream that is fed to a "downstream" device. Moreover, the "downstream" device is the device receiving the output from the "upstream" device. However, it is envisioned that a device may be both "upstream" and "downstream" of the same device in certain configurations, e.g., a system comprising a recycle loop.

Embodiments of the invention discussed herein relate to a system utilizing a reformate produced from a reformer in combination with an air supply to burn the reformate and thus heat exhaust after-treatment devices.

Reformer based after-treatment systems are currently being investigated as possible solutions for diesel emission control. Two main applications are to use the reformate to regenerate a diesel NOx trap and a diesel particulate filter where low temperature regeneration is emphasized. Even though the reformate can enhance the low temperature regeneration of these devices (thus expanding the temperature operating window) there is still a need for catalyst heating. During cold start, the temperature of the exhaust gas remains very low for a long period of time resulting in untreated emissions. By heating the catalyst to its operating temperature, more of the cold start emissions can be treated resulting in either better overall performance or the catalyst loading can be reduced to give the same performance. This also holds true of low speed/load points where the exhaust temperature drops below the operating window of the after-treatment device.

Figure 1:
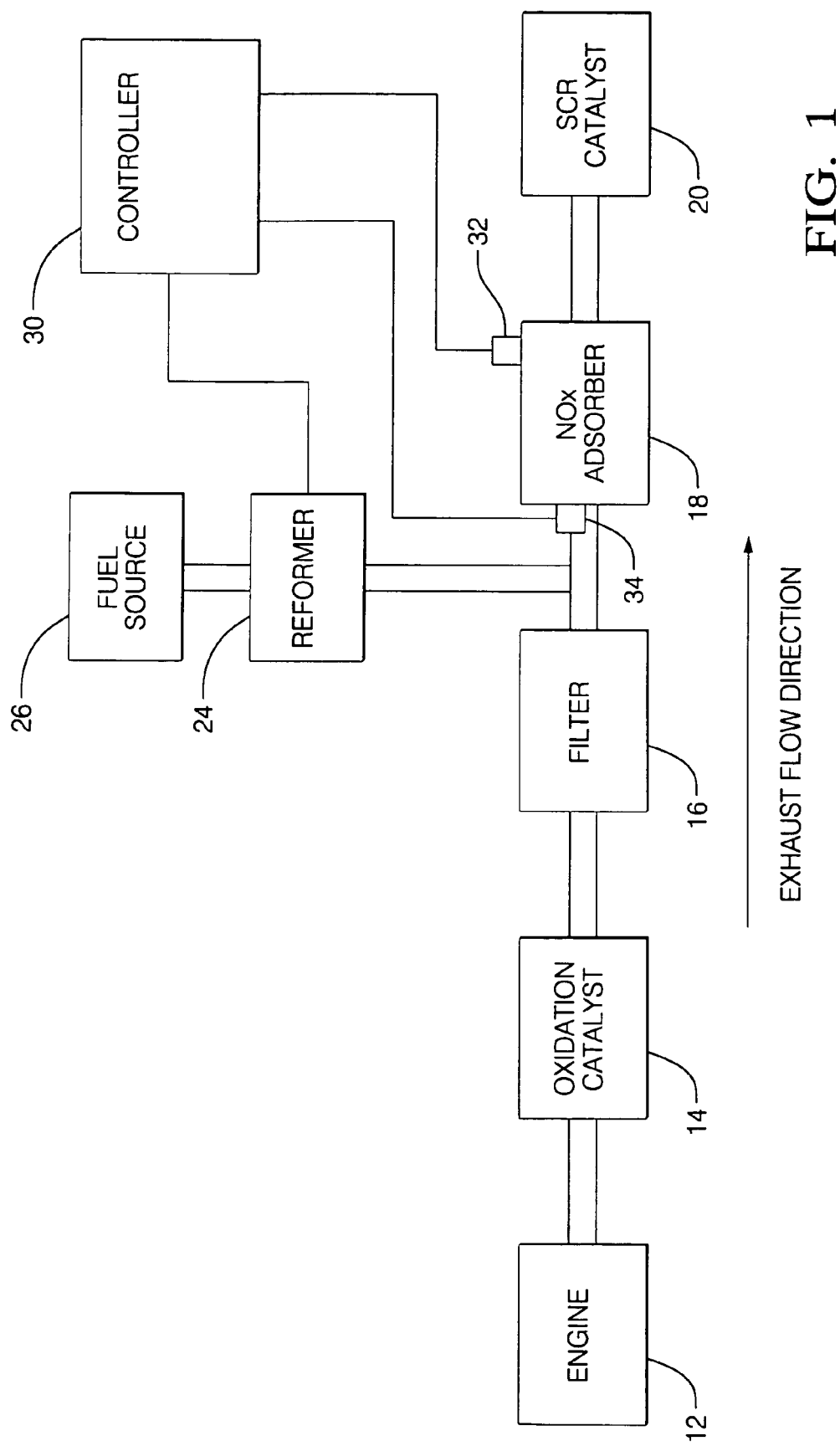
FIG. 1 is a block diagram of an exemplary system for controlling catalyst temperature.

Referring now to FIG. 1, an exemplary exhaust treatment system generally designated 100 is illustrated. While the location, number, and size, of each component may vary, this figure provides a starting point for discussion. The exhaust treatment system 100 comprises an engine 12. While the engine 12 may be a gasoline engine or a diesel engine, the system(s) illustrated herein are preferably for diesel engine systems. Disposed in fluid communication with engine 12 are an oxidation catalyst 14, a particulate filter 16, a $NO_x$ adsorber 18, and a Selective Catalytic Reduction (SCR) catalyst 20. An arrow labeled "exhaust flow direction" indicates the general flow of the exhaust in an exhaust conduit 22. The exhaust conduit 22 is in fluid communication with each component in the system. For example, in an exemplary embodiment, the general directional flow of exhaust fluid from the engine 12 may be through oxidation catalyst 14, particulate filter 16, $NO_x$ adsorber 18, and SCR catalyst 20. After passing through SCR catalyst 20, the exhaust fluid may then be discharged into an external environment.

In various embodiments, devices may be added or removed from system 100. For example, particulate filter 16 may be omitted in various embodiments. In other embodiments, $NO_x$ adsorber 18 may also be omitted. Conversely, for example, additional exhaust treatment device(s) (e.g., $NO_x$ adsorber(s), SCR catalyst(s), and/or the like) may be added to the system.

The particulate filter 16 can comprise any filter and design capable of removing particulate matter from the exhaust stream and preventing the emission of such particulate matter into the atmosphere. Preferably, the particulate filter comprises a gas permeable ceramic material having a honeycomb structure comprising a plurality of channels, preferably parallel channels. The channels can be divided into alternating inlet channels and exit channels. The inlet channels are open at an inlet end of the filter element and are preferably plugged at the exit end of the filter. Conversely, exit channels are preferably plugged at the inlet end and open at the exit end of the filter. The inlet and exit channels are separated by porous sidewalls, that permit the exhaust gases to pass from the inlet channels to the exit channels along their length.

The $NO_x$ adsorber 18 generally comprises a substrate, catalytic metal(s), support materials, and $NO_x$ trapping material(s). The catalytic metal component, the catalytic metal support, and the $NO_x$ trapping materials can be washcoated, imbibed, impregnated, physisorbed, chemisorbed, precipitated, or otherwise applied onto and/or within the porous substrate. The SCR catalyst 20 generally comprises a substrate, catalytic metal(s), support materials, and ammonia ($NH_3$) trapping material(s). Suitable $NH_3$ trapping materials include vanadium oxides, niobium oxides, molybdenum oxides, tungsten oxides, rhenium oxides, and the like, and combinations comprising at least one of the foregoing. Generally, the substrate, the catalytic metal(s), and the support materials employed in the SCR catalyst 20 are substantially the same as that used in $NO_x$ adsorber 18.

A fuel source 26 is in direct fluid communication with a reformer 24. Reformer 24 is capable of direct fluid communication with NOx adsorber 18. Reformate (e.g., hydrogen, carbon monoxide, partially oxidized organics such as aldehydes, ketones and carboxylic acids, and/or light gasses such as methane, ethane, propane, and/or butane) from reformer 24 may be selectively directed to NOx adsorber 18. Preferably, the reformate comprises primarily hydrogen and carbon monoxide, i.e., greater than or equal to 30% of the total volume of reformate is hydrogen and carbon monoxide, with greater than or equal to 40% preferred. The reformate may be used to regenerate particulate filter 16, and/or $NO_x$ adsorber 18 and/or create an exothermic reaction inside oxidation catalyst 14. A discussion of using reformate to selectively regenerate an particulate filter(s), and/or $NO_x$ adsorber(s) is found in U.S. patent application Ser. No. 10/301,455, which is incorporated herein by reference. The reformer may be in fluid communication with any number of after-treatment devices 14, 16, 18 and 20 and selectively supply reformate to one or more components using valves. A single fluid connection is shown in FIG. 1 to NOx adsorber 18 for ease of illustration and discussion.

A controller 30 communicates with the reformer 24, a temperature sensor 32 and an engine control unit (not shown). In order to perform the prescribed functions and desired processing, as well as the computations therefore (e.g., the control algorithm(s), and the like), the controller 30 may include, but not be limited to, a processor(s), computer(s), memory, storage, register(s), timing, interrupt(s), communication interface(s), and input/output signal interfaces, and the like, as well as combinations comprising at least one of the foregoing. As described in further detail herein, the controller 30 monitors NOx adsorber 18 temperature and controls the reformer 24 and/or engine parameters to increase the NOx adsorber catalyst temperature. Temperature sensor 32 may be embedded within the NOx adsorber 18, or positioned downstream of the NOx adsorber, and generates a temperature signal. Igniter 34 is positioned upstream of the NOx adsorber 18 to ignite reformate as described in further detail herein. The igniter 34 may be a spark generating device, a glow plug, etc. and operate in response to an ignition control signal from controller 30. Controller 30 may be a dedicated controller for regulating catalyst temperature, or may be a controller used in other systems such as an emissions control unit, master control unit, etc.

Figure 2:
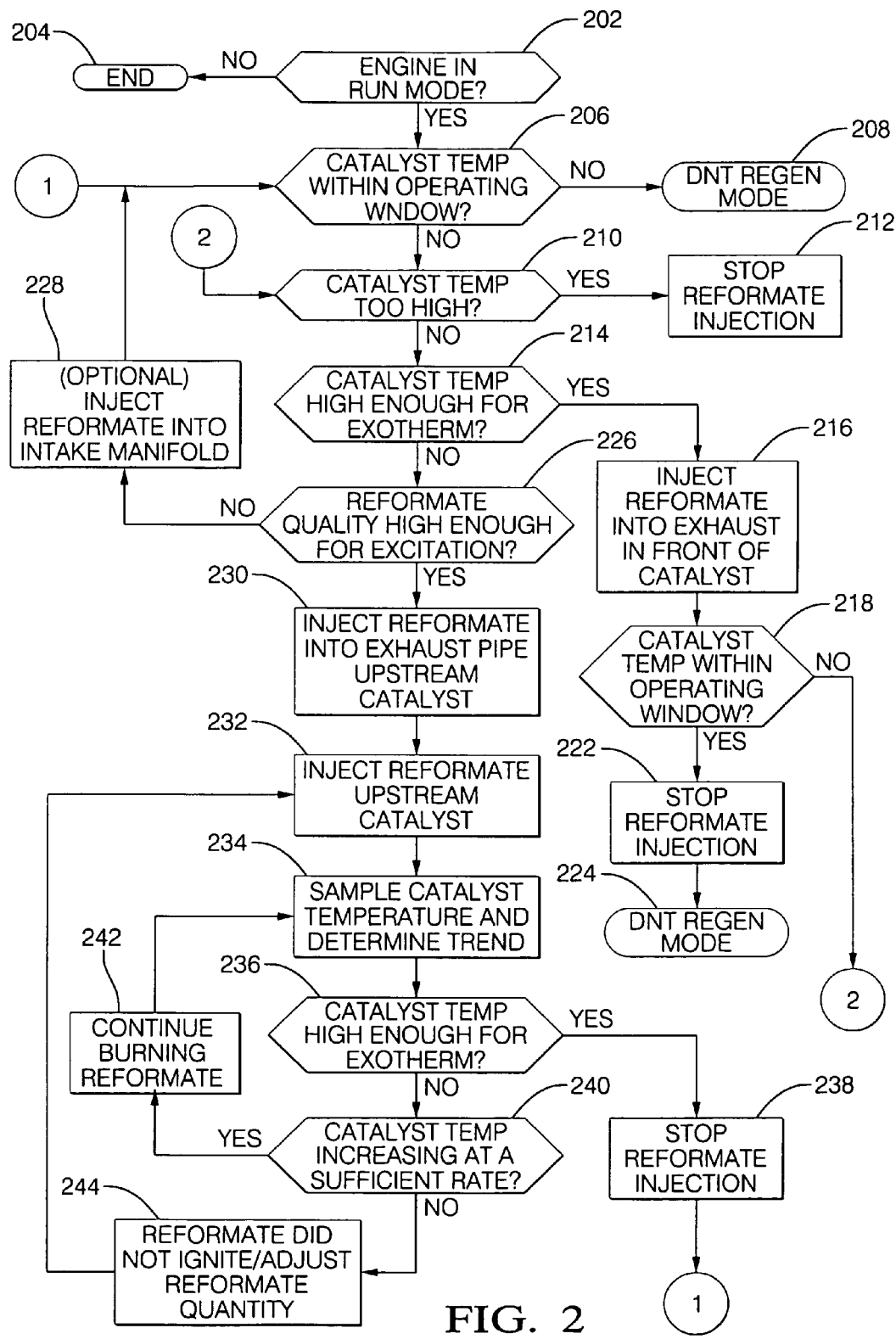
FIG. 2 is a flow chart of an exemplary process for controlling catalyst temperature.

FIG. 2 is a flowchart of an exemplary process for controlling catalyst temperature. Embodiments of the invention employ a cold start algorithm used in conjunction with a fuel reformer 24 for catalyst temperature control. This algorithm can be used on cold start to increase the catalyst temperature to within its operating window very quickly for fast light off and/or can be used to maintain the catalyst temperature within its operating window during normal operation The process begins at step 202 where controller 30 determines if the engine is in run mode. To determine this condition, the controller 30 communicates with another controller (e.g., master control unit) to detect engine status. If the engine is not in run mode, the process ends as shown at 204. If the engine is in run mode, a determination is made whether the catalyst temperature in NOx adsorber 18 is within the operating window of the catalyst at 206. If the catalyst temperature is within the operating temperature window the algorithm transitions to the diesel NOx trap (DNT) regeneration mode and exits the cold start algorithm as shown at 208. The catalyst temperature is monitored by temperature sensor 32 that provides a temperature signal to control 30.

At step 210, controller 30 determines whether the catalyst temperature is too high. If the catalyst temperature is above the operating window reformate injection is ceased at 212.

If step 214 is reached, the catalyst temperature is found to be below the operating window. At 214, the controller determines if the catalyst temperature is high enough for exotherm heating or if ignition heating is required. When it is determined that reformate injection is required for heating, the reformer is started in response to a command signal from controller 30. If the catalyst temperature is high enough for exotherm, the process flows to step 216 where the controller 30 provides a command signal to reformer 24 to inject reformate upstream of NOx adsorber 18. The reformate injection continues until the catalyst temperature is within the operating window, at which point reformate injection is ceased and DNT regeneration mode is entered as exhibited by steps 218, 222 and 224.

If the catalyst temperature is not sufficient for exotherm, flow proceeds to step 226 where it is determined if the reformate quality is high enough for combustion. The reformate quality may be determined by using sensors such as a hydrogen sensor, oxygen-to-carbon sensor, etc. If reformate quality is not high enough for combustion, as an option to eliminate cold start emissions of the reformer, the reformate can be directed to the engine intake when the quality of the reformate is too low to either ignite or create an exotherm in the catalyst as shown at 228. In this way the cold start emissions of the reformer can be reduced without the use of a warmed up catalyst.

Once the quality of the reformate is high enough to ignite or create an exotherm the reformate can be directed back to the exhaust component for heating. With the catalyst temperature below the light off temperature, ignition heating or burning of the reformate is used for fast warm up. The reformate is injected into the exhaust ahead of the catalyst as shown at 230 and is ignited as shown at 232. Igniter 34 ignites the reformate in response to an ignition command signal from controller 30. The catalyst temperature is then monitored for a rise in temperature at step 234.

At step 236, controller 30 determines if the catalyst temperature has reached the light off temperature of the catalyst. If so, a transition from burning reformate in front of catalyst to exotherm heating inside the catalyst occurs. The process flows to step 238 that involves stopping reformate injection and allowing the flame to extinguish. Once the flame is extinguished, reformate injection in front of the catalyst can continue at step 216 allowing exothermic reaction heating. As described above, during exothermic reaction heating the catalyst temperature is monitored to determine if exothermic reaction heating is occurring and if the catalyst is in the operating window. Once the catalyst temperature is within the operating temperature window, the reformate injection is stopped and the algorithm transitions into the normal DNT regeneration mode.

If at step 236, the catalyst temperature is not high enough for exothermic reaction to occur, flow proceeds to step 240 where the rate of temperature increase is monitored by controller 30. Controller 30 may determine the rate of change of the temperature of the catalyst and compare the measured rate of change to a threshold. If the temperature does not rise at a specified rate, the reformate did not light and measures need to be taken to ignite the reformate by adjusting reformate quantity as shown at 242. These measures may include, but are not limited to, adjusting the reformate flow rate, the air-fuel ratio of the exhaust gas by throttling the engine, adjusting EGR and post injection. From step 242, further attempts are made to ignite the reformate upstream of the catalyst as shown at 232.

If at step 240, the catalyst temperature is rising at a sufficient rate, the process continues to burn reformate as shown at step 244.

During normal operation of the system (i.e., fully warmed up) the catalyst temperature is monitored to determine if it is within the operating window. If the catalyst temperature falls below the operating temperature window, due to long periods of time at light loads for instance, the algorithm would employ the above heating strategy to increase the catalyst temperature.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A system for controlling temperature of a catalyst, comprising:
    an exhaust after-treatment device containing the catalyst, wherein the catalyst has a catalyst temperature;
    a temperature sensor configured for monitoring the catalyst temperature and generating a temperature signal;
    a controller configured for receiving the temperature signal;
    a reformer in fluid communication with the after-treatment device and in communication with the controller;
    an igniter upstream of and adjacent to the after-treatment device;
    an engine upstream of the igniter;
    if the catalyst temperature is high enough for exothermic reaction to occur, the controller configured for commanding the reformer to inject reformate to the catalyst; and
    if the catalyst temperature is not high enough for exothermic reaction to occur, the controller configured for commanding the reformer to inject reformate upstream of the catalyst and commanding the igniter to ignite the reformate.

2. A system for controlling temperature of a catalyst, comprising:
    an exhaust after-treatment device containing the catalyst;
    a temperature sensor configured for monitoring temperature of the catalyst and generating a temperature signal indicative of the catalyst temperature;
    a controller configured for receiving the temperature signal;
    a reformer in fluid communication with the after-treatment device and in communication with the controller;
    an igniter upstream of the after-treatment device;
    an engine upstream of the igniter;
    the controller configured for determining that the catalyst temperature is outside of a catalyst operating temperature window;
    if the catalyst temperature is high enough for exothermic reaction to occur, the controller configured for commanding the reformer to inject reformate to the catalyst; and
    if the catalyst temperature is not high enough for exothermic reaction to occur, the controller configured for commanding the reformer to inject reformate upstream of the catalyst and commanding the igniter to ignite the reformate.

3. The system of claim 2 wherein:
    the controller is configured to determine if the reformate is combustible, and command injecting reformate into an intake manifold if the reformate is not combustible.

4. The system of claim 2 wherein:
    the controller is configured to:
    sample catalyst temperature after the igniting;
    determine if the catalyst temperature after igniting is sufficient to form an exotherm; and cease igniting the reformate if the catalyst temperature after igniting is sufficient for exothermic reaction to occur.

5. The system of claim 2 wherein:
the controller is configured to:
sample catalyst temperature after the igniting; and
determine a rate of change of catalyst temperature.

6. The system of claim 5 wherein:
if the catalyst temperature rate of change is sufficient, the controller is configured to command continuing injecting and igniting reformate.

7. The system of claim 5 wherein:
if the catalyst temperature rate of change is not sufficient, the controller is configured to command adjusting reformate quantity.

8. The system of claim 7 wherein:
adjusting reformate quantity includes at least one of adjusting the reformate flow rate, adjusting the air-fuel ratio of the exhaust gas and adjusting EGR and post injection.

* * * * *